United States Patent
Yang et al.

(10) Patent No.: US 12,446,845 B2
(45) Date of Patent: Oct. 21, 2025

(54) SYSTEMS AND METHODS FOR CT IMAGE RECONSTRUCTION

(71) Applicant: GE Precision Healthcare LLC, Wauwatosa, WI (US)

(72) Inventors: Yirong Yang, Stanford, CA (US); Jiahua Fan, New Berlin, WI (US); Carrigan Hudgins, Milwaukee, WI (US); Brody DeSilva, San Jose, CA (US)

(73) Assignee: GE PRECISION HEALTHCARE LLC, Wauwatosa, WI (US)

( * ) Notice: Subject to any disclaimer, the term of this patent is extended or adjusted under 35 U.S.C. 154(b) by 411 days.

(21) Appl. No.: 18/151,681

(22) Filed: Jan. 9, 2023

(65) Prior Publication Data

US 2024/0225580 A1  Jul. 11, 2024

(51) Int. Cl.
*A61B 6/00* (2024.01)
*A61B 6/03* (2006.01)
(Continued)

(52) U.S. Cl.
CPC ............ *A61B 6/5205* (2013.01); *A61B 6/032* (2013.01); *A61B 6/4241* (2013.01); *A61B 6/467* (2013.01);
(Continued)

(58) Field of Classification Search
CPC ..... A61B 6/5205; A61B 6/032; A61B 6/4241; A61B 6/467; A61B 6/5258; A61B 6/583; A61B 6/585; A61B 6/5211
See application file for complete search history.

(56) References Cited

U.S. PATENT DOCUMENTS

| 10,980,506 B2 | 4/2021 | Roessl |
| 2007/0237288 A1* | 10/2007 | Tkaczyk ............... G01V 5/226 378/5 |

(Continued)

FOREIGN PATENT DOCUMENTS

JP  2019520909 A  7/2019

OTHER PUBLICATIONS

Alvarez, R. et al., "Energy-selective reconstructions in X-ray computerised tomography," Physics in Medicine and Biology, vol. 21, No. 5, Sep. 1976, 13 pages.
(Continued)

*Primary Examiner* — Casey Bryant
(74) *Attorney, Agent, or Firm* — McCoy Russell LLP

(57) ABSTRACT

Methods and systems are provided for reconstructing images within a photon-counting computed tomography (PCCT) system. In an example, a method comprises, during a scan of an imaging subject, obtaining photon counts from a detector element of a photon-counting detector of the PCCT system, the photon counts partitioned into a plurality of energy bins based on an energy imparted by each photon on the detector element; encoding the photon counts at the plurality of energy bins of the detector element into a single scalar output value, the single scalar output value representing a distribution of spectral information across the energy bins; and reconstructing an image from projection data acquired via the photon-counting detector, the projection data including the single scalar output value generated at the detector element; wherein a basis material decomposition process is not performed during image reconstruction.

20 Claims, 7 Drawing Sheets

(51) Int. Cl.
*A61B 6/42* (2024.01)
*A61B 6/46* (2024.01)
*A61B 6/58* (2024.01)
*G06T 11/00* (2006.01)

(52) U.S. Cl.
CPC ............ *A61B 6/5258* (2013.01); *A61B 6/583* (2013.01); *A61B 6/585* (2013.01); *G06T 11/005* (2013.01); *G06T 2211/424* (2013.01)

(56) References Cited

U.S. PATENT DOCUMENTS

2016/0239971 A1* 8/2016 Yu .................... A61B 6/582
2024/0023911 A1* 1/2024 Qiang ................ A61B 6/4241
2024/0374225 A1* 11/2024 Gilat-Schmidt ....... A61B 6/032

OTHER PUBLICATIONS

Liu, X. et al., "Quantitative imaging of element composition and mass fraction using dual-energy CT: Three-material decomposition," Medical Physics, vol. 36, No. 5, May 2009, 9 pages.

Long, Y. et al., "Multi-Material Decomposition Using Statistical Image Reconstruction for Spectral CT," IEEE Tansaction on Medical Imaging, vol. 33, No. 8, Aug. 2014, 13 pages.

Cong, W. et al., "Virtual Monoenergetic CT Imaging via Deep Learning," Patters (N.Y), vol. 1, No. 8, Oct. 19, 2020, 8 pages.

Grönberg, F. et al., "Feasibility of unconstrained three-material decomposition: imaging an excised human heart using a prototype silicon photon-counting CT detector," European Radiology, vol. 30, No. 11, Nov. 2020, 9 pages.

EP application 23217757.6 filed Dec. 18, 2023—extended Search Report issued Apr. 29, 2024; 8 pages.

Hans Bornefalk: "Application of photon counting multibin detectors to spectral CT", , Mar. 23, 2015 (Mar. 23, 2015), pp. 1-41, XP093152934, DOI: 10.13140/RG.2.1.4627.5283 Retrieved from the Internet: URL:https://www.researchgate.net/profile/Hans-Bornefalk/publication/282753891_Application_of_photon_counting_multibin_detectors_to_spectral_CT/links/561b68a508ae6d173089d512/Application-of-photon-countingmultibin-detectors-to-spectral-CT.pdf.

JP application 2023-207338 filed Dec. 8, 2023—Office Action issued Jan. 29, 2025; Machine Translation; 5 pages.

* cited by examiner

SYSTEMS AND METHODS FOR CT IMAGE RECONSTRUCTION

TECHNICAL FIELD

Embodiments of the subject matter disclosed herein relate to imaging systems and methods, and more particularly, to image reconstruction in computed tomography (CT) imaging systems.

BACKGROUND

In computed tomography (CT) imaging systems, an electron beam generated by a cathode is directed towards a target within an X-ray source or X-ray tube. A fan-shaped or cone-shaped beam of X-rays produced by electrons colliding with the target is directed towards a subject, such as a patient. After being attenuated by the object, the X-rays impinge upon an array of X-ray detectors, generating an image. A quality of a CT image may be increased by using Photon Counting CT (PCCT), where the X-ray detectors are photon-counting detectors, and photons are counted to provide spectral information. However, variance in PCCT detector performance and materials can cause artifacts in reconstructed images. The artifacts can be removed via a material decomposition (MD) process, but the process is time consuming and computationally intensive. Alternatively, methods for removing artifacts using deep learning have been proposed. However, such methods rely on substantial training data, where collecting the training data may be impractical or infeasible. As a result, a performance of the methods may be less than desired.

SUMMARY

In an example, a method for a photon-counting computed tomography (PCCT) system comprises, during a scan of an imaging subject, obtaining photon counts from a detector element of a photon-counting detector of the PCCT system, the photon counts partitioned into a plurality of energy bins based on an energy imparted by each photon on the detector element; encoding the photon counts at the plurality of energy bins of the detector element into a single scalar output value, the single scalar output value representing a distribution of spectral information across the energy bins; and reconstructing an image from projection data acquired via the photon-counting detector, the projection data including the single scalar output value generated at the detector element; wherein a basis material decomposition process is not performed during image reconstruction. Calculating the single scalar output value may include multiplying each photon count by a corresponding weight of a weight vector corresponding to the detector element stored in a memory of the PCCT system. The weight vector may be selected from a plurality of weight vectors generated during a calibration of the PCCT system prior to the scan, for each detector element, where the weights of the weight vectors are calculated based on a method that minimizes outputs of an objective function based on calibration detector data.

The above advantages and other advantages, and features of the present description will be readily apparent from the following Detailed Description when taken alone or in connection with the accompanying drawings. It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

Various aspects of this disclosure may be better understood upon reading the following detailed description and upon reference to the drawings in which.

DETAILED DESCRIPTION

Figure 1:
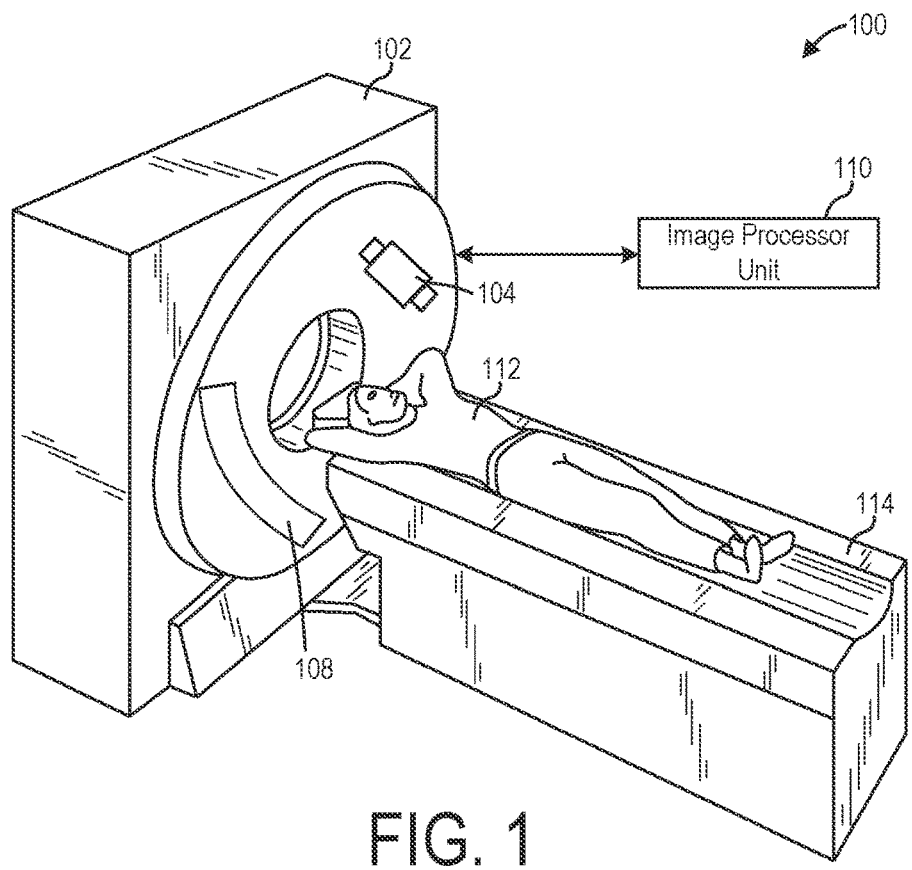
FIG. 1 shows a pictorial view of a computed tomography (CT) imaging system, in accordance with one or more embodiments of the present disclosure.

This description and embodiments of the subject matter disclosed herein relate to methods and systems for reconstructing computed tomography (CT) images from projection data acquired via a photon-counting computed tomography (PCCT) imaging system. In CT imaging systems, an X-ray source or X-ray tube emits an X-ray beam towards an object, such as a patient, and X-rays attenuated by the subject are detected by one or more detectors (e.g., a detector array) to generate projection data that is used to reconstruct one or more images. The X-ray detector or detector array typically includes a collimator for collimating X-ray beams received at the detector, a scintillator disposed adjacent to the collimator for converting X-rays to light energy, and photodiodes for receiving the light energy from the adjacent scintillator and producing electrical signals therefrom. An intensity of the attenuated X-ray beam radiation received at the detector array is typically dependent upon the attenuation of the X-ray beam by the patient. Each detector element of a detector array produces a separate electrical signal indicative of the attenuated beam received by each detector element. The electrical signals are transmitted to a data processing system for analysis. The data processing system processes the electrical signals to facilitate generation of an image. Generally, in CT systems the X-ray source and the detector array are rotated about a gantry within an imaging plane and around the patient, and images are generated from projection data at a plurality of views at different view angles. For example, for one rotation of the X-ray source, 1000 views may be generated by the CT system.

Conventional CT imaging systems utilize detectors that convert radiographic energy into current signals that are integrated over a time period, then measured and ultimately digitized. However, a drawback of such detectors is their inability to provide data or feedback as to the number and/or energy of photons detected. That is, the light emitted by the scintillator is a function of both a number of X-rays impinged and an energy level of the X-rays. The photodiodes may not be capable of discriminating between the energy level or the photon count from the scintillation. For example, two scintillators may illuminate with equivalent intensity and, as such, provide equivalent output to their respective photodiodes. Yet, despite yielding an equivalent light output, the number of X-rays received by each scintillator may be different, and an intensity of the X-rays may be different.

In contrast, PCCT detectors may provide photon counting and/or energy discriminating feedback with high spatial resolution. PCCT detectors can be caused to operate in an X-ray counting mode, and in an energy measurement mode of each X-ray event, allowing for the acquisition of both anatomical detail as well as tissue characterization information. In this regard, energy discriminating information or data may be used to reduce the effects of beam hardening and the like. Furthermore, these detectors support the acquisition of tissue discrimination data and therefore provide diagnostic information that is indicative of disease or other pathologies. PCCT detectors can also be used to detect, measure, and characterize materials that may be injected into a subject, such as contrast agents and/or other specialized materials, by the use of optimal energy weighting to boost the contrast of iodine and calcium (and other high atomic-number materials). Contrast agents can, for example, include iodine that is injected into the blood stream for better visualization. While a number of materials may be used in the construction of a direct conversion energy discriminating detector, semiconductors have been shown to be one preferred material. Typical materials for such use includes Cadmium Zinc Telluride (CZT), Cadmium Telluride (CdTe) and Silicon (Si), which have a plurality of pixilated anodes attached thereto.

One drawback of photon-counting detectors, however, is that due to manufacturing limitations, there may be inhomogeneities among different detector channels, which may induce ring artifacts in reconstructed CT images. A non-ideal energy response from different detector materials can also result in more polychromatic bin count data and induce beam hardening artifacts in images reconstructed from the bin count data. Removing the artifacts typically involves recalibration of the PCCT system (for ring artifacts), and/or applying an iterative material decomposition (MD) process based on an algorithm such as maximum likelihood estimation, which may be complex and time consuming. Additionally, an amount of computing resources and memory relied on for the MD process may be high. When images are generated slowly, users may be forced to wait for results, and a number of imaging tasks that may be performed within a given time frame may be decreased. Many imaging tasks rely on generating images within a short time frame. For example, fast imaging with accurate measurements may be relied on by perfusion studies, which may entail tracking a contrast uptake across a plurality of scans by analyzing a respective plurality of images.

To achieve the benefits of PCCT detectors without generating artifacts, thereby rendering the recalibration and/or MD process unnecessary and increasing a speed with which images can be reconstructed, systems and methods are proposed herein to generate high quality (e.g., artifact free) images by using an energy weighting method to convert the bin count data of an energy discriminating PCCT detector into a single virtual measurement that represents the distribution of energy across the bins. By reconstructing images based on the single virtual measurements calculated at each detector rather than the full projection data including the bin counts, and applying a correction function, CT images may be obtained rapidly without ring and/or beam hardening artifacts. As a result, computational resource usage and computation time during image reconstruction may be reduced. Additionally, as less data is transmitted from each detector to an image reconstructor, a data transmission time may be reduced, further reducing image reconstruction time. The CT images include virtual monoenergetic images (VMI) of different keVs, material decomposition images, and equivalent conventional single kV CT images.

Figure 2:
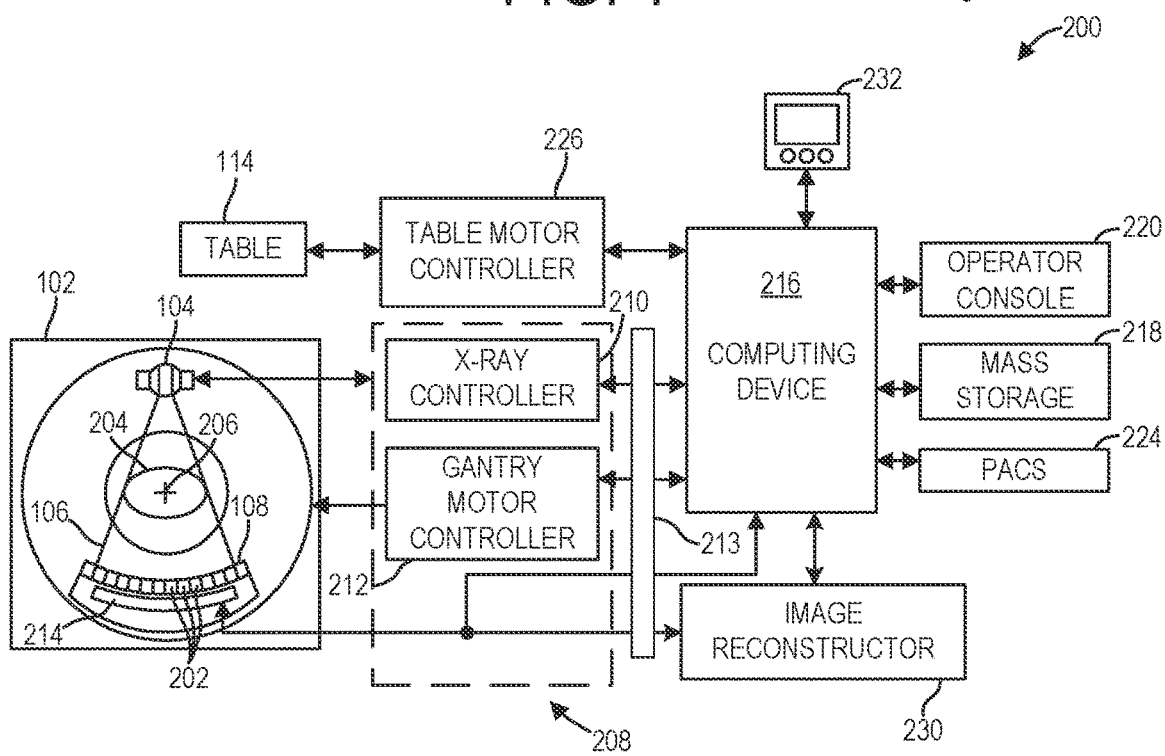
FIG. 2 shows a block schematic diagram of an example CT imaging system, in accordance with one or more embodiments of the present disclosure.
Figure 3:
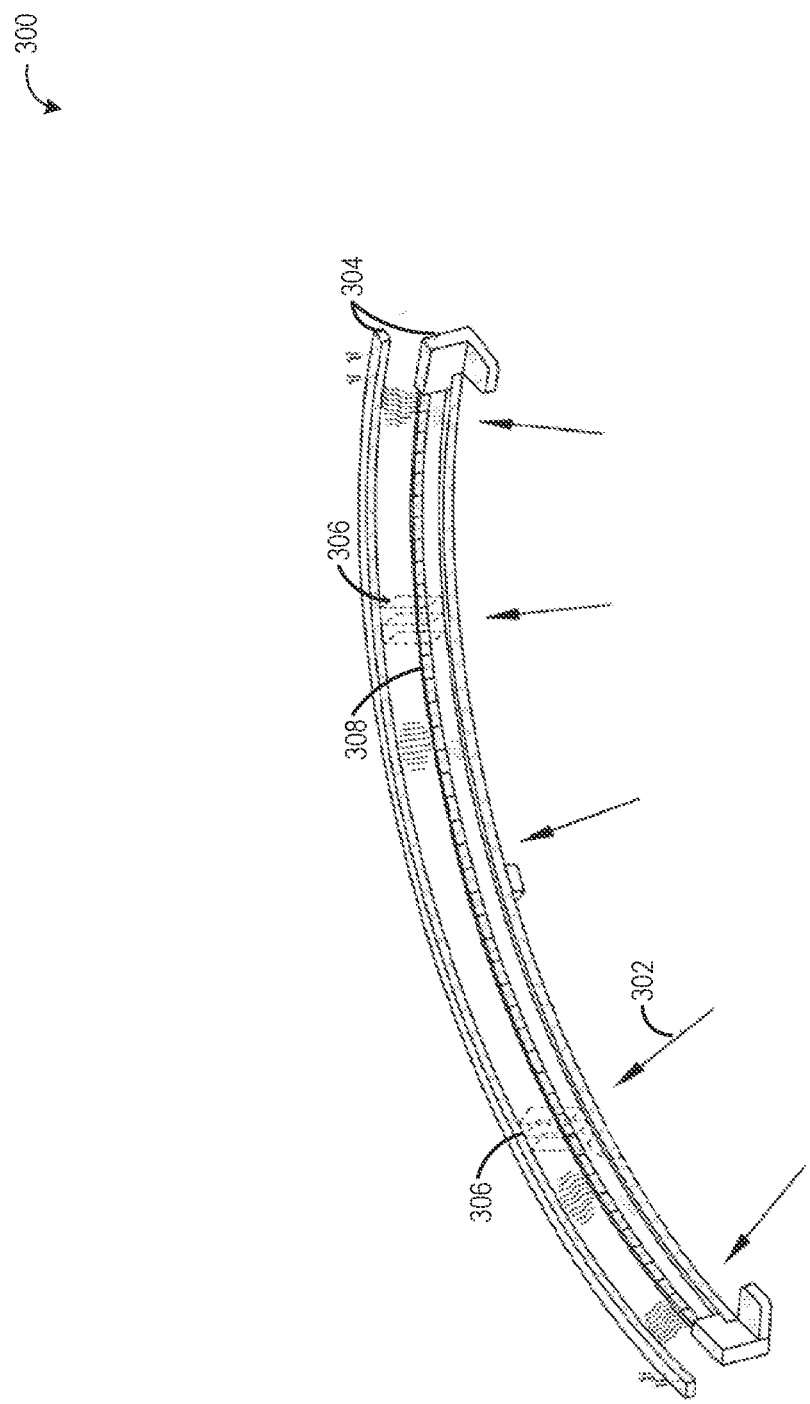
FIG. 3 is a schematic diagram of an exemplary detector array of a PCCT system, in accordance with one or more embodiments of the present disclosure.
Figure 4A:
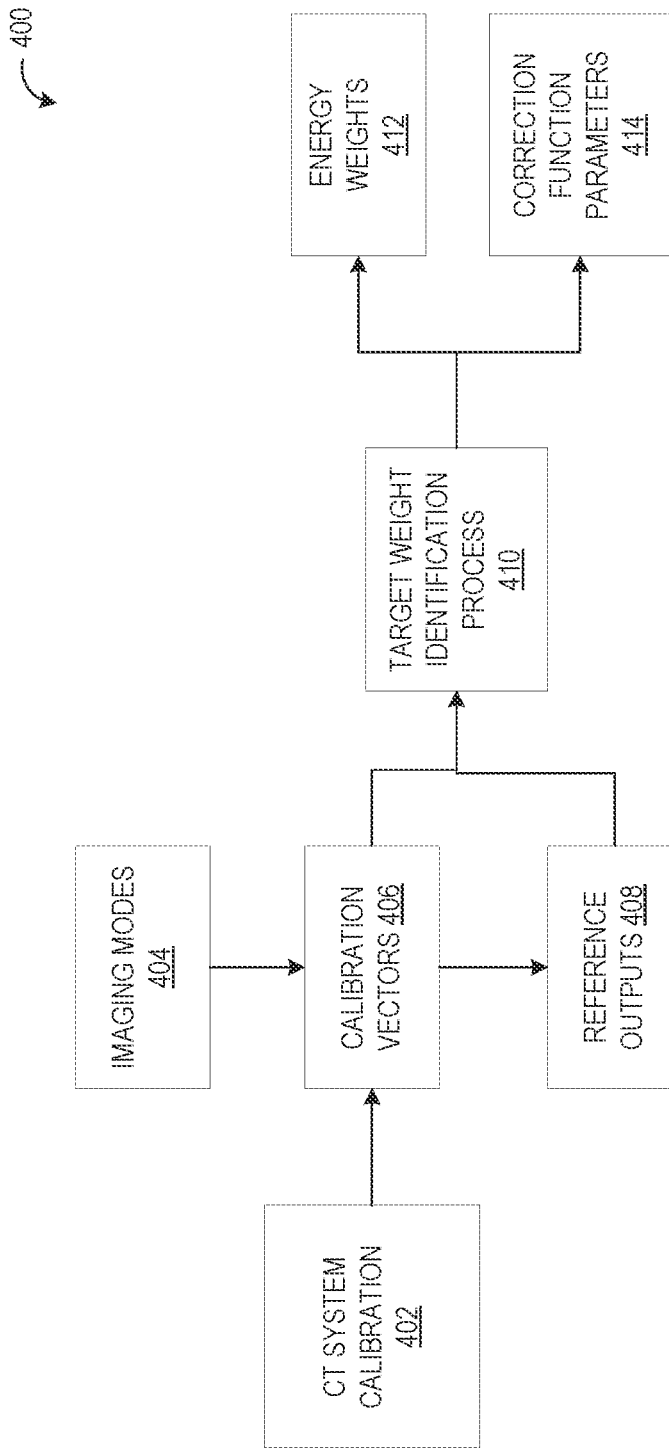
FIG. 4A is a high-level information flow diagram showing a generation of data parameters during calibration of a CT imaging system, according to embodiments of the present disclosure.
Figure 4B:
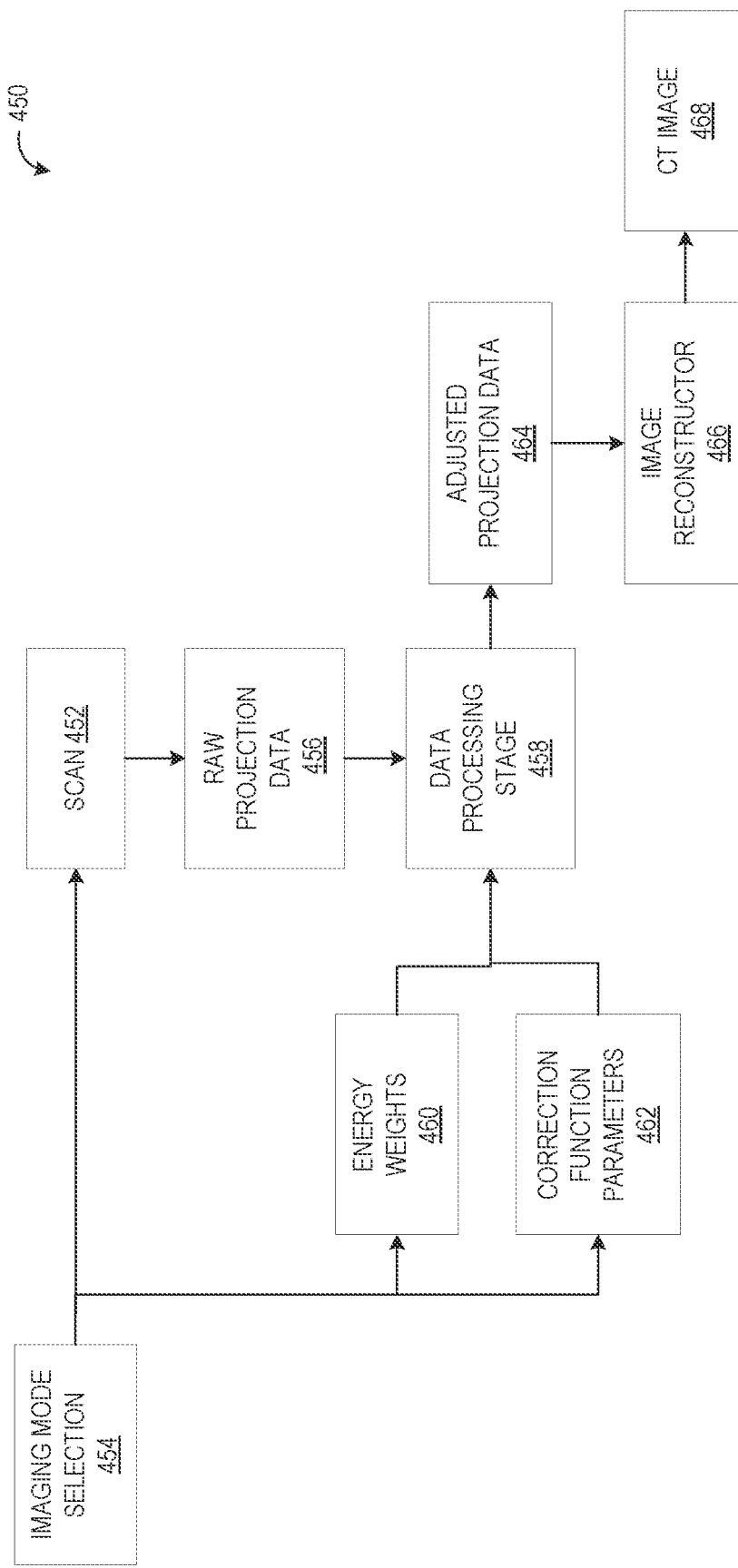
FIG. 4B is a high-level information flow diagram showing an application of the data parameters of FIG. 4A during a scan performed using the CT imaging system, according to embodiments of the present disclosure.

An example of a PCCT system that may be used to perform imaging scans in accordance with the present techniques is provided in FIGS. 1 and 2. FIG. 3 shows an example detector array of the PCCT system, where photons of X-rays directed at a subject by an X-ray source are counted by detectors of the detector array. FIG. 4A shows, at a high level, how energy weights and various parameters of a correction function are generated during a calibration stage of the CT system, which may be accomplished in accordance with the detailed procedure outlined in FIG. 5. FIG. 4B shows how the energy weights and correction function parameters may be applied to raw projection data during a scan to generate an image. During the scan, the counted photons may be partitioned into bins, and the photon counts at each bin may be weighted and summed to reduce an amount of data used in image reconstruction, while retaining energy discrimination data obtained by the detectors, in accordance with the method of FIG. 6. The weighted sums of the photon counts may be calculated in accordance with the method of FIG. 7.

FIGS. 1-3 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below/underneath one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

FIG. 1 illustrates an exemplary PCCT system 100 configured for CT imaging with photon-counting detectors. Particularly, the PCCT system 100 is configured to image a subject 112 such as a patient, an inanimate object, one or more manufactured parts, and/or foreign objects such as dental implants, stents, and/or contrast agents present within the body. The PCCT system 100 includes a gantry 102, which in turn, may further include at least one X-ray source 104 configured to project a beam of X-ray radiation 106 (see FIG. 2) for use in imaging the subject 112 laying on a table 114. Specifically, the X-ray source 104 is configured to project the X-ray radiation beams 106 towards a detector array 108 positioned on the opposite side of the gantry 102. Although FIG. 1 depicts a single X-ray source 104, in certain embodiments, multiple X-ray sources and detectors may be employed to project a plurality of X-ray radiation beams for acquiring projection data at the same or different energy levels corresponding to the patient. In some embodiments, the X-ray source 104 may enable dual-energy gemstone spectral imaging (GSI) by rapid peak kilovoltage (kVp) switching. In the embodiments described herein, the X-ray detector employed is a photon-counting detector which is capable of differentiating X-ray photons of different energies.

In certain embodiments, the PCCT system 100 further includes an image processor unit 110 configured to reconstruct images of a target volume of the subject 112 using an iterative or analytic image reconstruction method. For example, the image processor unit 110 may use an analytic image reconstruction approach such as filtered back projection (FBP) to reconstruct images of a target volume of the patient. As another example, the image processor unit 110 may use an iterative image reconstruction approach such as advanced statistical iterative reconstruction (ASIR), conjugate gradient (CG), maximum likelihood expectation maximization (MLEM), model-based iterative reconstruction (MBIR), and so on to reconstruct images of a target volume of the subject 112. In some examples the image processor unit 110 may use both an analytic image reconstruction approach such as FBP in addition to an iterative image reconstruction approach.

In some CT imaging system configurations, an X-ray source projects a cone-shaped X-ray radiation beam which is defined with respect to an X-Y-Z Cartesian coordinate system and generally referred to as an "imaging volume." The X-ray radiation beam passes through an object being imaged, such as the patient or subject. The X-ray radiation beam, after being attenuated by the object, impinges upon an array of detector elements. The intensity of the attenuated X-ray radiation beam received at the detector array is dependent upon the attenuation of an X-ray radiation beam by the object. Each detector element of the array produces a separate electrical signal that is a measurement of the X-ray beam attenuation at the detector location. The attenuation measurements from all the detector elements are acquired separately to produce a transmission profile.

In some CT systems, the X-ray source and the detector array are rotated with a gantry within the imaging volume and around the object to be imaged such that an angle at which the X-ray beam intersects the object constantly changes. A group of X-ray radiation attenuation measurements, e.g., projection data, from the detector array at one gantry angle is referred to as a "view." A "scan" of the object includes a set of views made at different gantry angles, or view angles, during one revolution of the X-ray source and detector.

FIG. 2 illustrates an exemplary imaging system 200 similar to the PCCT system 100 of FIG. 1. In accordance with aspects of the present disclosure, the imaging system 200 is configured for imaging a subject 204 (e.g., the subject 112 of FIG. 1). In one embodiment, the imaging system 200 includes the detector array 108 (see FIG. 1). The detector array 108 further includes a plurality of detector elements 202 that together sense the X-ray radiation beam 106 (see FIG. 2) that passes through the subject 204 (such as a patient) to acquire corresponding projection data. In some embodiments, the detector array 108 may be fabricated in a multi-slice configuration including the plurality of rows of cells or detector elements 202, where one or more additional rows of the detector elements 202 are arranged in a parallel configuration for acquiring the projection data.

In certain embodiments, the imaging system 200 is configured to traverse different angular positions around the subject 204 for acquiring desired projection data. Accordingly, the gantry 102 and the components mounted thereon may be configured to rotate about a center of rotation 206 for acquiring the projection data, for example, at different energy levels. Alternatively, in embodiments where a projection angle relative to the subject 204 varies as a function of time, the mounted components may be configured to move along a general curve rather than along a segment of a circle.

As the X-ray source 104 and the detector array 108 rotate, the detector array 108 collects data of the attenuated X-ray beams. The data collected by the detector array 108 undergoes pre-processing and calibration to condition the data to represent the line integrals of the attenuation coefficients of the scanned subject 204. The processed data are commonly called projections. In some examples, the individual detectors or detector elements 202 of the detector array 108 may include photon-counting detectors which register the interactions of individual photons into one or more energy bins.

The acquired sets of projection data may be used for basis material decomposition (BMD). During BMD, the measured projections are converted to a set of material-density projections. The material-density projections may be reconstructed to form a set of material-density maps or images of each respective basis material, such as bone, soft tissue, and/or contrast agent maps. The density maps or images may be, in turn, associated to form a 3D volumetric image of the basis material, for example, bone, soft tissue, and/or contrast agent, in the imaged volume.

Once reconstructed, the basis material image produced by the imaging system 200 reveals internal features of the subject 204, expressed in the densities of two basis materials. The density image may be displayed to show these features. In traditional approaches to diagnosis of medical conditions, such as disease states, and more generally of medical events, a radiologist or physician would consider a hard copy or display of the density image to discern characteristic features of interest. Such features might include lesions, sizes and shapes of particular anatomies or organs, and other features that would be discernable in the image based upon the skill and knowledge of the individual practitioner.

In one embodiment, the imaging system 200 includes a control mechanism 208 to control movement of the components such as rotation of the gantry 102 and the operation of the X-ray source 104. In certain embodiments, the control mechanism 208 further includes an X-ray controller 210 configured to provide power and timing signals to the X-ray source 104. Additionally, the control mechanism 208 includes a gantry motor controller 212 configured to control a rotational speed and/or position of the gantry 102 based on imaging requirements.

In certain embodiments, the control mechanism 208 further includes a data acquisition system (DAS) 214 configured to sample analog data received from the detector elements 202 and convert the analog data to digital signals for subsequent processing. The DAS 214 may be further configured to selectively aggregate data from a subset of the detector elements 202 into so-called macro-detectors. The data sampled and digitized by the DAS 214 may be transmitted to a computer or computing device 216 via a slip ring 213. In one example, the computing device 216 stores the data in a storage device or mass storage 218. The storage device 218, for example, may be any type of non-transitory memory and may include a hard disk drive, a floppy disk drive, a compact disk-read/write (CD-R/W) drive, a Digital Versatile Disc (DVD) drive, a flash drive, and/or a solid-state storage drive.

Additionally, the computing device 216 provides commands and parameters to one or more of the DAS 214, the X-ray controller 210, and the gantry motor controller 212 for controlling system operations such as data acquisition and/or processing. In certain embodiments, the computing device 216 controls system operations based on operator input. The computing device 216 receives the operator input, for example, including commands and/or scanning parameters via an operator console 220 operatively coupled to the computing device 216. The operator console 220 may include a keyboard (not shown) or a touchscreen to allow the operator to specify the commands and/or scanning parameters.

Although FIG. 2 illustrates one operator console 220, more than one operator console may be coupled to the imaging system 200, for example, for inputting or outputting system parameters, requesting examinations, plotting data, and/or viewing images. Further, in certain embodiments, the imaging system 200 may be coupled to multiple displays, printers, workstations, and/or similar devices located either locally or remotely, for example, within an institution or hospital, or in an entirely different location via one or more configurable wired and/or wireless networks such as the Internet and/or virtual private networks, wireless telephone networks, wireless local area networks, wired local area networks, wireless wide area networks, wired wide area networks, etc.

In one embodiment, for example, the imaging system 200 either includes, or is coupled to, a picture archiving and communications system (PACS) 224. In an exemplary implementation, the PACS 224 is further coupled to a remote system such as a radiology department information system, hospital information system, and/or to an internal or external network (not shown) to allow operators at different locations to supply commands and parameters and/or gain access to the image data.

The computing device 216 uses the operator-supplied and/or system-defined commands and parameters to operate a table motor controller 226, which in turn, may control a table 114 which may be a motorized table. Specifically, the table motor controller 226 may move the table 114 for appropriately positioning the subject 204 in the gantry 102 for acquiring projection data corresponding to the target volume of the subject 204.

As previously noted, the DAS 214 samples and digitizes the projection data acquired by the detector elements 202. Subsequently, an image reconstructor 230 uses the sampled and digitized X-ray data to perform high-speed reconstruction. Although FIG. 2 illustrates the image reconstructor 230 as a separate entity, in certain embodiments, the image reconstructor 230 may form part of the computing device 216. Alternatively, the image reconstructor 230 may be absent from the imaging system 200 and instead the computing device 216 may perform one or more functions of the image reconstructor 230. Moreover, the image reconstructor 230 may be located locally or remotely, and may be operatively connected to the imaging system 200 using a wired or wireless network. Particularly, one exemplary embodiment may use computing resources in a "cloud" network cluster for the image reconstructor 230.

In one embodiment, the image reconstructor 230 stores the images reconstructed in the storage device 218. Alternatively, the image reconstructor 230 may transmit the reconstructed images to the computing device 216 for generating useful patient information for diagnosis and evaluation. In certain embodiments, the computing device 216 may transmit the reconstructed images and/or the patient information to a display or display device 232 communicatively coupled to the computing device 216 and/or the image reconstructor 230. In some embodiments, the reconstructed images may be transmitted from the computing device 216 or the image reconstructor 230 to the storage device 218 for short-term or long-term storage.

Information may be transmitted between the components residing in the gantry 102 and external devices (such as the computing device 216 and/or image reconstructor 230) via the slip ring 213, which facilitates electronic communication across the rotating gantry.

Referring now to FIG. 3, a PCCT photon-counting detector array 300 is shown, which may be a non-limiting example of detector array 108 of FIG. 2. Detector array 300 includes rails 304 having collimating blades or plates 306 placed therebetween. Plates 306 are positioned to collimate X-rays 302 before such beams impinge upon a plurality of detector modules 308 of detector array 300, which may be arranged between the plates 306. As an example, detector array 300 may include 57 detector modules 308, each detector module 308 having an array size of 64×16 of detector elements (e.g., pixels). As a result, detector array 300 would have 64 rows and 912 columns (16 pixels×57 detector modules), allowing for 64 simultaneous slices of data to be collected with each gantry rotation (e.g., the gantry 102 of FIG. 1).

As described above, each detector element of each detector module 308 may be designed to directly convert radiographic energy to electrical signals including energy discriminatory or photon count data. For example, when a photon impinges upon a detector element of a detector module 308, a charge may be generated within a semiconductor layer of the detector element that is proportional to the energy of the photon. A comparator may compare the voltage of the generated charge to one or more thresholds and increment a count of a bin (of a plurality of bins) based on the voltage relative to the one or more thresholds. The plurality of bins may include 8 bins, for example, with energy thresholds configured for optimal material decomposition performance.

The output of the detector element may be referred to as the bin counts, as the photon counts are partitioned into the energy bins based on the energy of each photon that impinges on the detector array. The number of energy bins may be based on the configuration of the detector. For example, silicon detectors may be configured to differentiate photon energy into 8 energy bins, while cadmium telluride detectors may be configured to differentiate photon energy into 5 bins. The energy thresholds that define the energy bins may be determined during a calibration phase, and/or may be based on the specific scan protocol. In some examples, the energy thresholds may be determined to optimize material basis decomposition and/or to maximize detected spectral information for a given incident spectrum emitted by the X-ray source. In a non-limiting example, the energy bin thresholds may be 4, 14, 30, 37, 47, 58, 67, and 79 keV for an 8 bin detector, or 10, 34, 50, 62, and 76 keV for a 5 bin detector. The bin counts (e.g., photon counts partitioned into energy bins) may be obtained for each detector element of the detector and for each view obtained during a scan.

Thus, the X-ray beam may generate multiple photon counts (e.g., one or more counts for each energy bin) for each detector element, resulting in substantially more data than that generated by integrating detectors. Generating images from the data collected with photon-counting detectors may be time-consuming, which may delay image review. An additional issue with PCCT systems is that an output generated at different detector channels may vary due to manufacturing limitations, which may introduce ring artifacts in reconstructed CT images. Further, a non-ideal energy response from different detector materials may result in more polychromatic binned data, which may generate beam hardening artifacts in reconstructed images.

As described in greater detail below, an amount of time taken to generate the images may be reduced, without introducing ring and/or beam hardening artifacts, by generating pseudo-conventional CT images that do not involve material decomposition of projection data via an iterative algorithm such as maximum likelihood estimation, which may be complex and/or time consuming. The pseudo-conventional CT images may be generated by calculating a single scalar output value for each detector element, based on a linear weighted sum of photon counts at each bin of the detector element. The weights used to generate the linear weighted sum may be determined during a calibration stage of the CT system based on a material decomposition of one or more phantoms scanned during the calibration, as described below in reference to FIGS. 4A and 5. By outputting the single scalar value at each detector element instead of a plurality of bin counts, an amount of data transmitted from the detector elements to the image reconstructor may be reduced, further decreasing a time and complexity of image processing.

FIG. 4A outlines a high level process 400 for generating sets of energy weights and correction function parameters generated during a calibration of a PCCT system, such as PCCT system 100 of FIGS. 1 and 2. Prior to performing scans, during a CT system calibration 402, a PCCT system is typically calibrated to ensure a consistency of outputs generated at detector elements of the PCCT system. Due to manufacturing limitations, not every detector element may generate the same output, and there may be a variance between detector element outputs. To minimize the variance, a set of calibration vectors 406 are generated during scanning of a phantom including known basis materials. Each calibration vector may include a plurality of normalized calibration values generated from a respective plurality of bin counts generated at a detector element when scanning the phantom. These calibration values may be used to generate a set of parameters, for each detector element, which may be used in an equation to correct outputs of different detector elements to maintain the outputs within a desired range. To avoid confusion, it should be appreciated that the term "calibration vector" herein refers to the normalized calibration values collected during the calibration process, and not the set of parameters ultimately used to correct detector outputs, which may elsewhere be referred to as calibration vectors. Additionally, other aspects of the PCCT system may be initialized and/or calibrated during the calibration stage, such as, for example, energy bin thresholds that define energy bins for each detector.

As described in more detail below in reference to FIG. 5, after the CT system calibration 402 has been performed and the calibration vectors 406 have been obtained, during an additional calibration task, a set of reference outputs of the detector elements of the CT system may be generated using the calibration vectors 406, based on one or more imaging modes 404 supported by the CT system (e.g., VMI, MBD, conventional CT image, etc.). For example, a first set of reference outputs 408 may be generated from the calibration vectors 406 based on a first imaging mode 404; a second set of reference outputs 408 may be generated from the calibration vectors 406 based on a second imaging mode 404; and so on.

Once the reference outputs have been obtained, a target weight identification process 410 may be performed for each detector element of a plurality of detector elements of the detector of the PCCT system. During the target weight identification process 410, a set of target energy weights 412 may be determined that minimize a variance between a weighted sum of bin counts at the detector element and a second weighted sum using pre-defined equal weights (e.g., air counts). A set of target correction function parameters 414 may also be determined that minimize a squared difference between an estimated output and a ground truth reference output. The target weight identification process 410 is described in greater detail below in reference to FIG. 5. The energy weights 412 and correction function parameters 414 may be stored in a memory of the PCCT system, to be applied later during a scan, as described below in reference to FIG. 4B.

FIG. 4B outlines a high level process 450 for applying sets of energy weights 460 and correction function parameters 462 during a scan 452 performed using a PCCT system, to generate pseudo-VMI images with reduced artifacts, which may be reconstructed more rapidly than conventional VMI images relying on a BMD process during image reconstruction. Scan 452 is initiated based on an imaging mode selection 454, where a type of desired image may be selected by a user of the PCCT system. Energy weights 460 and correction function parameters 462 may be generated during calibration of the PCCT system, as described in reference to FIG. 4A, and thus energy weights 460 and correction function parameters 462 may be selected from energy weights 412 and correction function parameters 414 based on imaging mode selection 454.

Scan 452 generates a set of raw projection data 456. As raw projection data 456 is being generated, raw projection data 456 may be processed in a data processing stage 458, described in more detail below in reference to FIGS. 6 and 7. During data processing stage 458, energy weights 460 and correction function parameters 462 may be applied to the raw projection data 456 to generate a set of adjusted projection data 464. The set of adjusted projection data 464 may include less data than the raw projection data 456. Specifically, raw projection data 456 may include bin count data of a plurality of detector elements, while adjusted projection data 464 may include single scalar values representing the bin count data, and may not include the bin count data. The adjusted projection data 464 may be used by an image reconstructor 466 (e.g., image reconstructor 230) to reconstruct an image 468. Reconstructed image 468 may be of a quality similar to an image reconstructed from the raw projection data 456. However, reconstructed image 468 may be reconstructed more quickly than the image reconstructed from the raw projection data 456.

Figure 5:
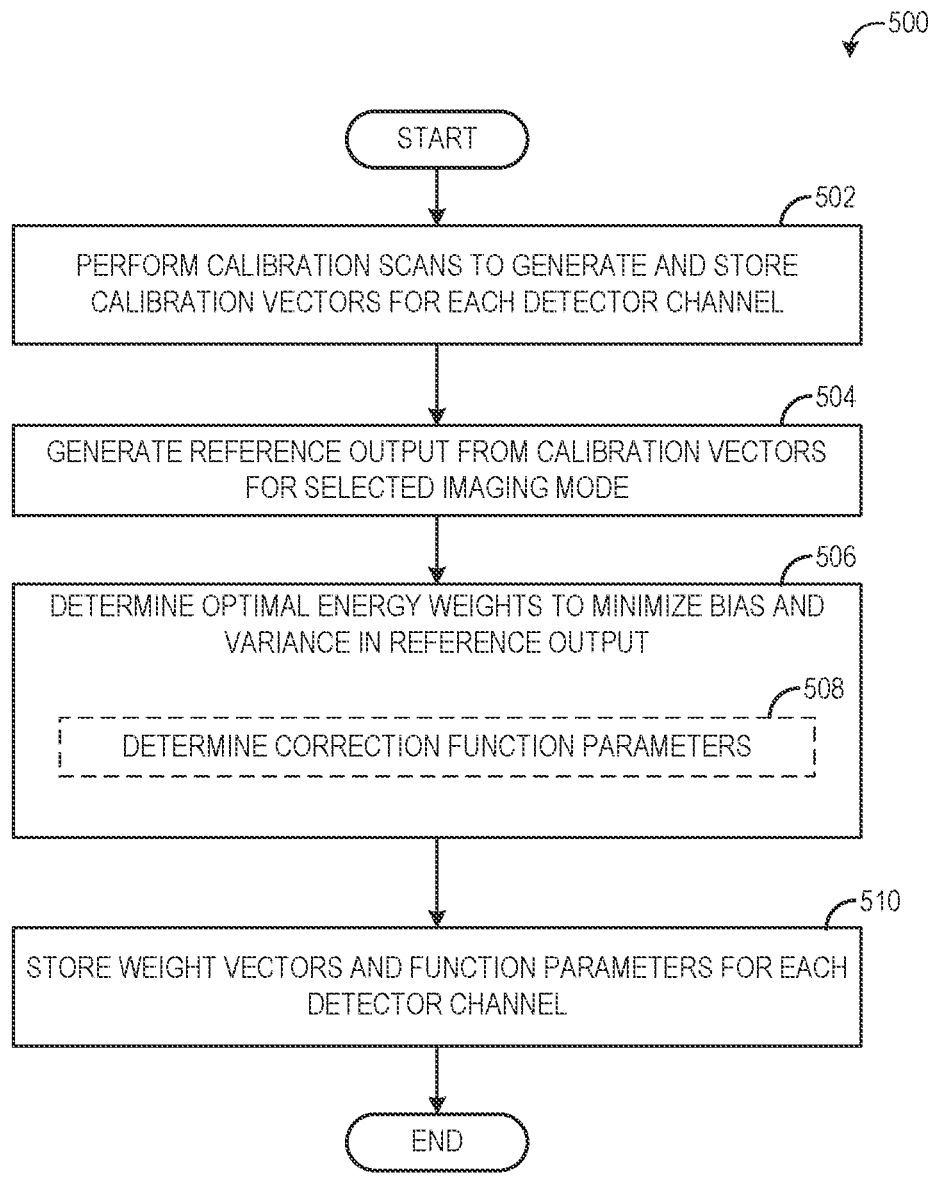
FIG. 5 is a flowchart illustrating a method for calibrating a PCCT system, according to embodiments of the present disclosure.

Turning now to FIG. 5, a method 500 is shown for generating a set of energy weight vectors during a calibration of a PCCT system, such as the PCCT system 100 of FIGS. 1 and 2, where the weight vectors may be applied to bin counts during a subsequent scan. When the weight vectors are applied to the bin counts, bin count data may be combined into a single value, which may be used to reconstruct an image, as described below in reference to FIG. 6. Method 500 may be carried out according to instructions stored in memory of one or more controllers or computing devices included as part of and/or operatively coupled to a CT imaging system, such as DAS 214, X-ray controller 210, image reconstructor 230, and/or computing device 216.

At 502, method 500 includes performing calibration scans to generate and store calibration vectors. During the calibration scan(s), detector data (e.g., calibration vectors) may be obtained while scanning object(s) of known size and composition, referred to as phantoms, and/or by performing scans without any scanned object, to generate air counts. The detector data may include photon counts partitioned into bins based on the energy of each photon, such as eight or five energy bins, depending on the configuration of the detector.

The calibration scans may be performed to calibrate the specific CT imaging system, such as to determine the response of each detector element, identify optimal energy bin thresholds, etc. During the calibration scan, one or more phantoms are scanned so that the material composition and thickness of the imaging subject is known. For example, known materials of different combinations and different thicknesses may be scanned using different current and peak kilovoltage settings. The phantoms may be composed of one or more suitable materials, such as polyvinyl chloride (PVC) or polyethylene (PE). In some examples, the phantoms may include regions of water, iodide, calcium, and/or other materials (e.g., other contrast agents). In some examples, one or more of the phantoms may be step-wedge phantoms. During the calibration scans, the CT imaging system may be controlled such that the X-ray source emits X-rays that are detected by the detector of the CT imaging system after attenuation by each scanned phantom. As mentioned above, calibration scans may also be performed without a scanned object, to generate air count vectors for each detector element. The air count vectors may be used in the weighting method described below.

After calibration, a calibration vector is stored in a memory of the PCCT system for each detector channel. Each calibration vector comprises a set of collections A of normalized bin counts for corresponding ground truth basis material thickness pairs, where the size of A corresponds to a number of desired basis materials $N_{mat}$, and a number of calibration points $N_{cal}$, as follows:

$$A \in \mathbb{R}^{N_{mat} \times N_{cal}}$$

For example, two basis materials (e.g., PE and PVC) and ten calibration points may be used, where each calibration point includes path length data corresponding to a thickness pair (e.g., a thickness of the first material with respect to a thickness of the second material). Thus, A may include path length data for a total of ten combinations of PE and PVC in various thicknesses. It is to be appreciated that the number of calibration points is exemplary and other numbers of calibration points may be obtained without departing from the scope of this disclosure.

A collection of calibration vectors n describing the native bin counts collected at each calibration point may be described as follows:

$$n \in \mathbb{R}^{N_{bin} \times N_{cal}}$$

where $N_{bin}$ represents the number of energy bins. In various embodiments, the bin counts may be normalized by total counts. For example, if photon counts are partitioned into eight energy bins, and ten calibration points are used, n may be divided into 8 calibration vectors (e.g., one calibration vector generated for each thickness pair), each with 10 values, where each value of the calibration vectors may correspond to an observed photon count at a bin of the detector for a corresponding thickness pair. In other words, n may be a 2D matrix, where each column of the 2D matrix represents the binned counts of all energy bins collected by the detector when the x-ray penetrates a particular PE and PVC thickness pair. Each row of the 2D matrix represents counts collected by the detector corresponding to a particular energy bin when the x-ray penetrates the different thickness pairs. Thus, the 2D matrix includes $N_{bin}$ row vectors with size 1-by-$N_{cal}$, each row vector representing a corresponding bin count of the energy bin for different PE and PVC thicknesses.

At 504, method 500 includes generating a reference output from the calibration vectors for a desired imaging mode. The imaging mode may be based on what kind of image is desired (e.g., VMI, BMD, conventional CT image, etc.). The desired imaging mode may define a reference kilovoltage (keV) to be used to generate the reference output. According to the desired imaging mode, the calibration vector may be used to generate a reference output for the detector, for a given number of basis materials. The reference output is a ground truth output determined based on known linear attenuation values for each basis material, and known thickness pairs of the basis materials. For example, for an 80 keV VMI, with PE and PVC as basis materials, a reference output O of a detector may be described by the following equation:

$$O = [\mu_{PE}(80 keV), \mu_{PVC}(80 keV)]A$$

where $\mu_{PE}$ (80 keV) and $\mu_{PVC}$ (80 keV) are known linear attenuation values for PE and PVC at 80 keV, and A represents a matrix with different combinations of PE and PVC with known pathlengths (thicknesses). O is a one dimensional vector, where a size of O corresponds to the number of calibration points. Each element of O is a scalar value representing an attenuation of a monochromatic x-ray beam at 80 keV as it passes through a corresponding PE/PVC thickness pair.

Thus, the reference or ground truth output estimates information that might typically be generated from a material decomposition process after projection data is acquired.

At 506, method 500 includes determining a set of target energy weights for each detector, where the target energy weights minimize bias and variance in an objective function based on the reference output from the detector. The target energy weights may be stored in a weight vector, where a size of the weight vector may be the same as the number of energy bins of the detector. Each weight of the weight vector may be applied to a respective energy bin of the detector, which may adjust the counts of one or more, or all of the energy bins. For example, the weight vector may indicate that bin 1 is to be weighted by 0.5, while bin 2 is to be weighted by 1. Applying the weights may result in the count for bin 1 being halved, while the count for bin 2 is not changed. After applying the weights from the weight vector, the weighted counts may be summed to form a linear weighted sum to generate the reference output.

In general, the weights can take on any continuous real value. The weights may be normalized to a range of ±1 since normalization or scaling produces weights with which the summed weighted bin counts contain the same amount of information. In some examples, the weights may be binary weights, which are a special case of the more general continuous weights. With binary weights, the weights are either 0 or 1, and each original bin either does not or does contribute to the weighted bins through a summation. The contribution from the original bins may be mutually exclusive, in which case each original bin contributes once and only once to a summed bin. Each weight vector may be used to weight the full/original bin counts, and the respective weighted bin counts may be summed.

The method used determines target energy weights that minimize the objective function, which may be the example objective function provided below. The objective function includes a first term for minimizing variance in detector output due to generating an output based on the weighted sum of bin counts as compared with an output using equal weights for each bin, and a second term for minimizing a bias of an estimated output from the ground truth reference output O:

$$\hat{W} = \underset{W}{\operatorname{argmin}} \sum_{j=1}^{N_{cal}} \left( \frac{\operatorname{Var}(f(l_j, a))}{\operatorname{Var}(f(l_j^{(0)}, a))} + \alpha(O_j - f(l_j, a))^2 \right)$$

Where l is normalized to air scan data represented by $N_i^{(0)}$:

$$l_j = -\ln \frac{\sum_{i=1}^{N_{bin}} W_i N_i}{\sum_{i=1}^{N_{bin}} W_i N_i^{(0)}}$$

and $l_j^{(0)}$ is when equal weights are used:

$$l_j^{(0)} = -\ln \frac{\sum_{i=1}^{N_{bin}} N_i}{\sum_{i=1}^{N_{bin}} N_i^{(0)}}$$

and α is a trade-off parameter. $f(l_j,a)$ is obtained by fitting a desired simple correction function such that $f(l,a)=0$, where a is a vector of function parameters applied to l. Thus, the target energy weights and a are generated for each detector pixel. At 508, determining the target energy weights may include determining the parameter vector parameters a that minimize a difference between $f(l_j,a)$ and a corresponding reference output. In some embodiments, the function $f$ may be a linear function, whereby the output of $f(l,a)$ is based on a linear addition of factors defined by a. In other embodiments, the function may be a non-linear function or even a nonparametric function, for example, a look-up table.

At 510, method 500 includes storing the weight vectors and function parameters for each detector channel. The weight vectors and function parameters may be saved in memory (e.g., in DAS 214), to be applied during a subsequent scan of an imaging target, such as the scan described below with respect to FIG. 5. Method 500 ends.

Figure 6:
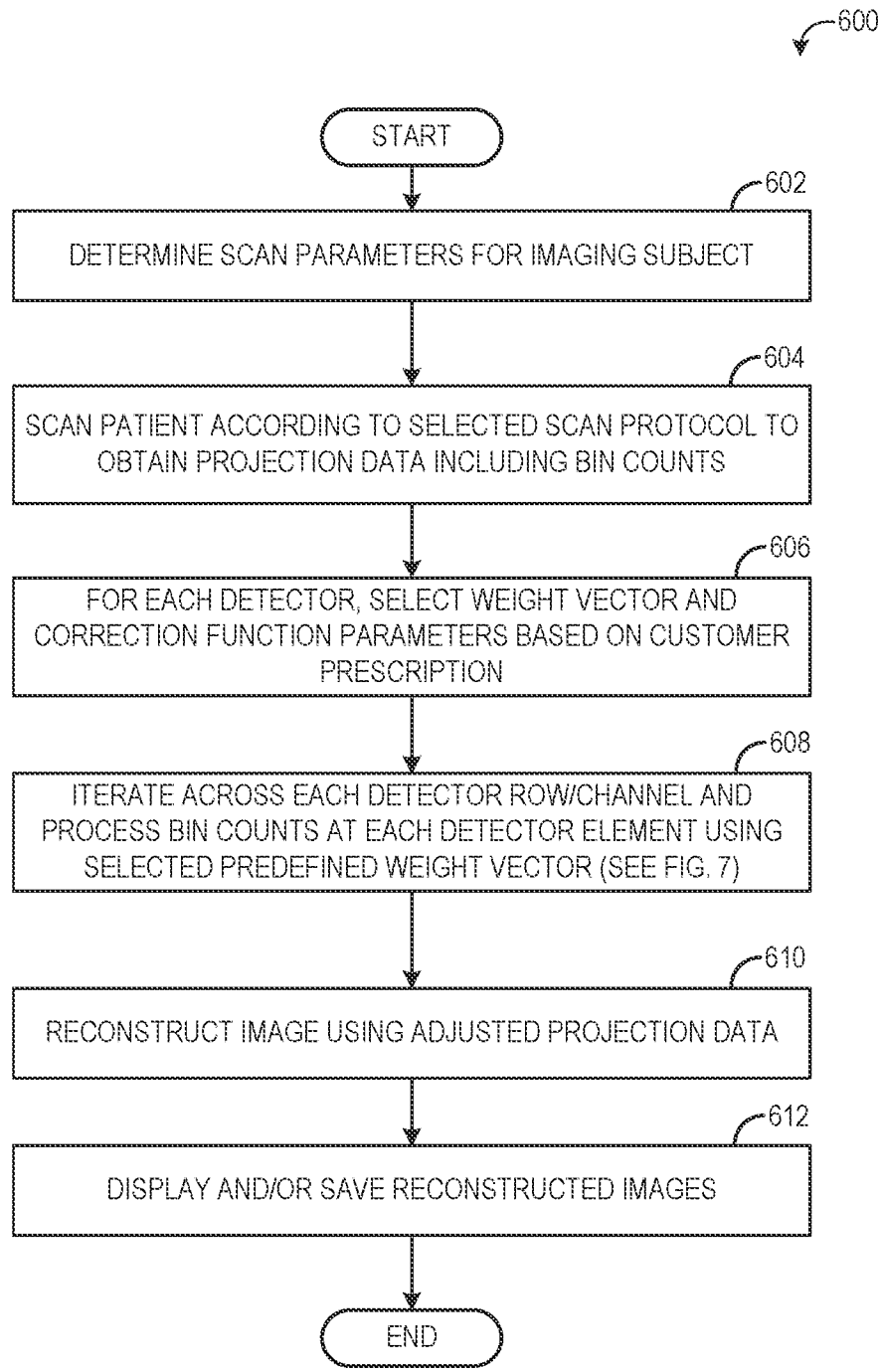
FIG. 6 is a flowchart illustrating a method for generating CT images using a PCCT system, according to embodiments of the present disclosure.

FIG. 6 illustrates a method 600 for a PCCT system (e.g., PCCT system 100) for reconstructing a CT image from projection data including weighted linear sums of photon counts at a plurality of energy bins, rather than from projection data including photon count data from each bin of the plurality of energy bins. Method 600 may be carried out according to instructions stored in memory of one or more controllers or computing devices included as part of and/or operatively coupled to a CT imaging system, such as DAS 214, X-ray controller 210, image reconstructor 230, and/or computing device 216.

At 602, method 600 includes determining scan parameters to be applied during the scan of the imaging subject. The scan parameters may be determined based on a selected scan protocol and/or based on user input received at a computing device of the CT imaging system (e.g., computing device 216). The scan parameters may include the scan prescription (e.g., X-ray source voltage and current, slice thickness, gantry table speed, etc.), the anatomy being scanned, whether one or more contrast agents have been administered to the imaging subject, and other parameters. The scan protocol may include an imaging mode specifying a desired type of image to reconstruct, such as a VMI, and a peak kilovoltage to be applied during the scan.

At 604, method 600 includes scanning the imaging subject according to the selected scan protocol to obtain detector data including bin counts. The detector data may include, for each detector element of the photon-counting detector (e.g., for each detector element 202), photon counts partitioned into a plurality of energy bins based on an energy imparted by each photon on the photon-counting detector, referred to as bin counts herein. During the patient scan, the X-ray source (e.g., X-ray source 104 of FIGS. 1 and 2) of the PCCT system may be controlled to emit X-rays according to a scan prescription set forth by the selected scan protocol (e.g., with a set X-ray source or X-ray tube current and voltage). Detector data may be obtained from detector elements of a detector array (e.g., detector array 108 of FIGS. 1 and 2) as the X-ray source and detector array rotate around the imaging subject, resulting in a plurality of views of detector data being obtained. For each view, a photon count for each energy bin for each detector element of the detector array is generated (e.g., during readout of the detector array by DAS 214). For example, in detector configurations with eight energy bins, eight photon counts may be generated for each detector element of the detector array and for each view.

At 606, method 600 includes selecting a weight vector and correction function parameters for each detector element, based on the prescribed imaging mode and associated kilovoltage. In some embodiments, a size of the imaging subject may also be a factor in selecting the weight vector. For example, a size of a first, larger patient may be approximated by a first set of thickness pairs of basis materials used to generate a first calibration vector, whereby a first weight vector may be selected at least partially based on the first calibration vector. A second size of a second, smaller patient may be approximated by a second set of thickness pairs of basis materials used to generate a second calibration vector, whereby a second weight vector may be selected at least partially based on the second calibration vector. In various embodiments, the weight vector may be selected from a set of candidate weight vectors generated during the calibration stage as described above in reference to FIG. 5, and stored in a memory of the CT system (e.g., in DAS 214).

At 608, method 600 includes iterating across each detector row/channel and processing the bin counts at each detector element using the selected weight vector and correction function parameters, to adjust an output of the detector element. As explained above, the selected energy weight vector and correction function parameters may include values optimized for reconstructing images for the prescribed imaging mode. The adjusted output of the detector element may be a single scalar value representing an energy distribution across a plurality of energy bins of the detector element, rather than a vector of photon counts observed at each energy bin. Processing the bin counts is described in greater detail below in reference to FIG. 7.

After the adjusted output is calculated, the corresponding value may be sent (e.g., from the DAS) to an image reconstructor (e.g., image reconstructor 230) or another suitable computing device, where the single scalar values from a plurality of detector elements may be used to reconstruct one or more images. In some examples, the original/full bin counts may also be sent to the image reconstructor. In this way, initial images may be generated relatively quickly using the linear weighted sums, while additional images may be generated using the original/full bin counts after a delay period (as the original/full bin counts may take more time to be sent to the image reconstructor), if desired.

At 610, method 600 includes reconstructing one or more images using the adjusted output of the detector element (e.g., adjusted projection data). The images may be reconstructed by the image reconstructor or the other suitable computing device. In various embodiments, the images may be VMIs (e.g., grayscale images) or BMD images. At 612, the reconstructed images are displayed on a display device and/or saved in memory (e.g., in a PACS as part of a patient exam).

Thus, method 600 advantageously generates images with reduced artifacts without relying on a BMD process, which may be time consuming and resource intensive. In other words, with a conventional CT system, after projection data is acquired, reconstructing an image would include decomposing bin counts into selected basis materials or attenuation components (e.g., Compton and photoelectric) using maximum likelihood estimation (MLE), least-squared, polynomial fitting, neural networks, or other suitable decomposition methods, and then reconstructing MD images using filtered backprojection or another suitable reconstruction technique. A VMI at a selected energy (e.g., keV level) may then be formed by linear combination of the reconstructed images. By reconstructing the image based on the adjusted projection data (e.g., where bin counts are weighted using pre-defined weight vectors generated during calibration of the PCCT system and summed), rather than projection data including the bin counts, the BMD process may not be used, and an artifact-free image may be reconstructed more rapidly and using less computational resources than the conventional approach described above. As a result, reconstructed images may be generated with the same or similar image quality, in less time, and more efficiently in terms of computational and memory resources.

Figure 7:
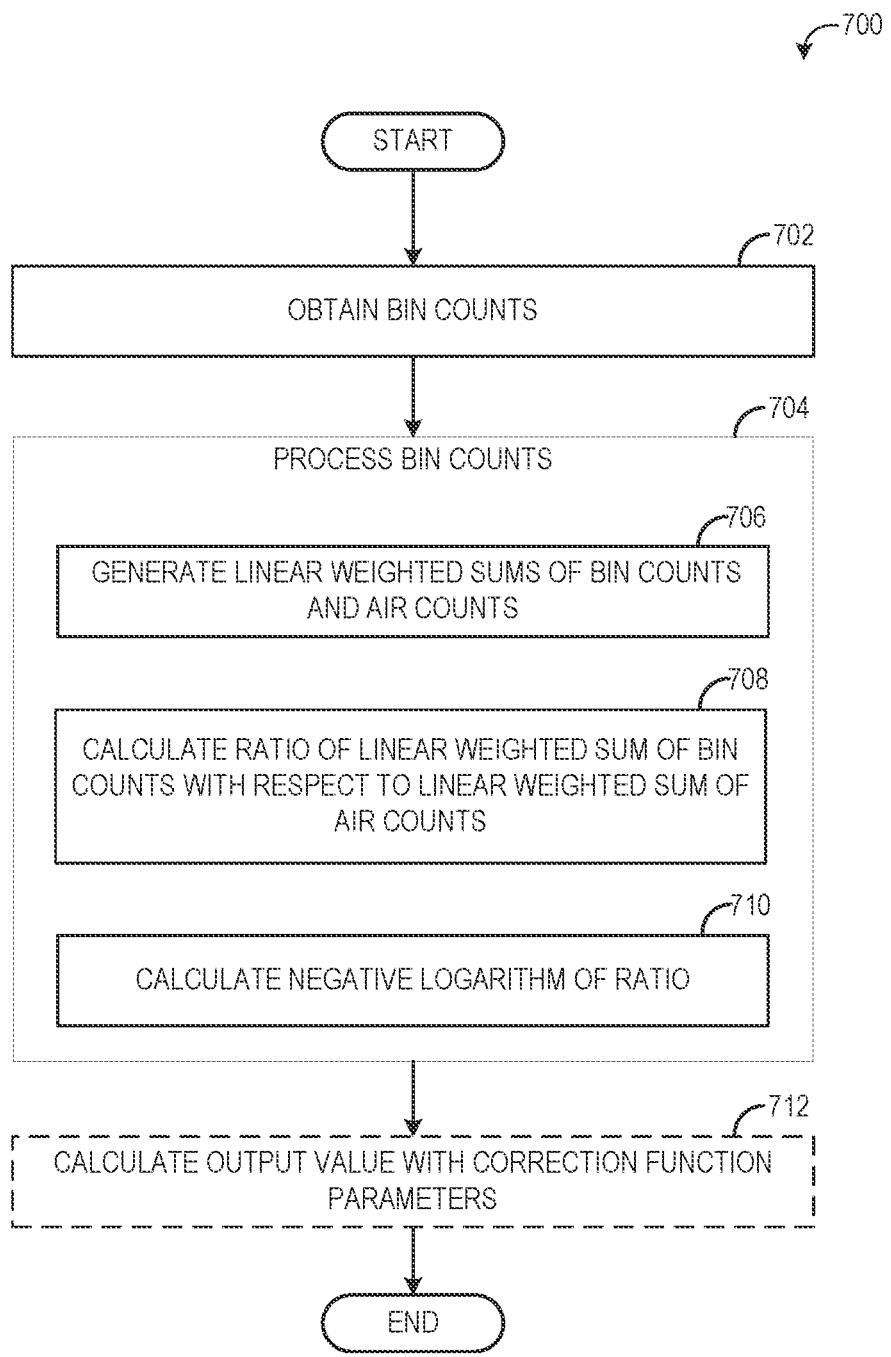
FIG. 7 is a flowchart illustrating a method for generating a single scalar output value of a detector array of a PCCT system, according to embodiments of the present disclosure.

FIG. 7 illustrates a method 700 for processing bin counts at a detector element of a PCCT system such as PCCT system 100, using a pre-defined weight vector, to generate a single scalar output value of the detector element that may be used to reconstruct an image. The pre-defined weight vector may be generated during calibration of the PCCT system, as described above in reference to FIG. 5. Method 700 may be carried out according to instructions stored in memory of one or more controllers or computing devices included as part of and/or operatively coupled to a CT imaging system, such as DAS 214, X-ray controller 210, image reconstructor 230, and/or computing device 216. In various embodiments, method 700 may be carried out as part of method 600 described above in reference to FIG. 6.

At 702, method 700 includes obtaining full bin counts from the detector element. The full bin counts may be similar to the full bin counts described above with respect to FIGS. 5 and 6, e.g., photon counts partitioned into the full number of energy bins allowed by the configuration of the detector, such as 5 or 8 bins. The bin counts may be obtained for each detector element of a detector array and for each view obtained during the scan.

At 704, method 700 includes processing the bin counts to generate a single scalar output of the detector element, using a selected weight vector. In various embodiments, selection of the weight vector may be carried out as described above in reference to FIG. 6. Processing the bin counts may include calculating an energy-weighted line integral according to the equation below:

$$l = -\ln\frac{\sum_{i=1}^{N_{bin}} W_i N_i}{\sum_{i=1}^{N_{bin}} W_i N_i^{(0)}}$$

where $N_i$, are corresponding bin counts, and $N_i^{(0)}$ are corresponding air counts (e.g., when a phantom is not used and the electron beams pass through the air). Thus, at 706, as indicated in this equation, method 700 includes generating a linear weighted sum of bin counts and air counts at the detector element. In other words, the detector data from each detector element may be converted from the full number of bins (e.g., eight or five bins) to the linear weighted sum. Each bin may be weighted by an amount specified by a weight of the weight vector, and then the weighted bins may be summed to form the weighted summed bin. At 708, calculating the line integral includes calculating the ratio of the linear weighted sum of the bin counts using the selected weight vector, to a weighted sum of the air counts using a corresponding air count vector, and at 710, calculating the line integral includes calculating a negative logarithm of the ratio.

At 712, method 700 includes adjusting an output of the energy weighting line integral by applying the correction function $O=f(l,a)$ used during calibration to the calculated line integral to generate the single scalar output value. The correction function may be applied with the set of correction function parameters a determined during calibration, as described above in reference to FIG. 5. In some embodiments, the correction function may be applied using a lookup table.

Thus, a plurality of energy bin counts (such as 5 or 8 energy bins) may be converted into a single value that represents a distribution of spectral energy across the energy bins. The single values may be sent for image reconstruction, which may expedite the reconstruction of at least initial images during a CT exam.

Thus, systems and methods are described herein for generating images via a PCCT system with a reduced number of artifacts, without performing a BMD process to remove artifacts. Instead, an energy weighting process is performed at system calibration to determine a set of target weights that may be used to weight bin counts during a later scan. Different weight vectors may be stored for different imaging modes and kilovoltages, and different material thickness pairs scanned during calibration. The weight vectors are used to generate scalar values that are outputted by each detector element of the PCCT system during scans. Images, such as VMI images, BMD images, or conventional CT images, may be generated from the scalar values, rather than from full bin count data. As a result, image generation may be performed more quickly and efficiently than other methods that rely on reconstructing images from full bin count data and applying a computationally intensive iterative BMD process, reducing resource use and saving time. The methods described herein may also generate images of a higher quality than may currently be generated using a deep-learning neural network approach, with the additional advantage that training data is not relied on and need not be collected, stored, and processed, decreasing a use of computational and memory resources. The technical effect of using a weighting method to generate images from scalar value detector element outputs rather than full bin count data is that a time spent generating images and an amount of processing power and memory used by the PCCT system may be reduced.

The disclosure also provides support for a method for a photon-counting computed tomography (PCCT) system, the method comprising: during a scan of an imaging subject, obtaining photon counts from a detector element of a photon-counting detector of the PCCT system, the photon counts partitioned into a plurality of energy bins based on an energy imparted by each photon on the detector element, encoding the photon counts at the plurality of energy bins of the detector element into a single scalar output value, the single scalar output value representing a distribution of spectral information across the energy bins, and reconstructing an image from projection data acquired via the photon-counting detector, the projection data including the single scalar output value generated at the detector element, wherein a basis material decomposition process is not performed during image reconstruction. In a first example of the method, the single scalar output value is generated at the detector element and transmitted to an image reconstructor of the PCCT system to reconstruct the image, and the photon counts are not transmitted to the image reconstructor. In a second example of the method, optionally including the first example, encoding the photon counts at the plurality of energy bins of the detector element into the single scalar output value further comprises calculating a linear weighted sum of the photon counts. In a third example of the method, optionally including one or both of the first and second examples, calculating the linear weighted sum further comprises multiplying each photon count by a corresponding weight of a weight vector corresponding to the detector element stored in a memory of the PCCT system, the weight vector selected from a set of weight vectors generated during a calibration of the PCCT system. In a fourth example of the method, optionally including one or more or each of the first through third examples, the corresponding weights of the weight vectors are calculated based on calibration detector data obtained from a calibration scan of a phantom, the calibration detector data comprising, for each detector element of the photon-counting detector, photon counts partitioned into the plurality of energy bins based on the energy of each photon that impinges on the detector element. In a fifth example of the method, optionally including one or more or each of the first through fourth examples, the weight vector is selected from the set of weight vectors based on a selected imaging mode and associated kilovoltage. In a sixth example of the method, optionally including one or more or each of the first through fifth examples, calculating the linear weighted sum further comprises calculating a line integral of a ratio between the linear weighted sum and a second linear weighted sum of a plurality of air counts generated during the calibration of the PCCT system, the second linear weighted sum of the plurality of air counts calculated using the weight vector. In a seventh example of the method, optionally including one or more or each of the first through sixth examples, the method further comprises: generating the weights in accordance with a method that minimizes: a bias of an estimated output of the detector element from a ground truth reference output of the detector element, the reference ground truth output generated using the calibration detector data, and a variance between the linear weighted sum and a second estimated output of the detector element based on equal weighting of the photon counts at the plurality of energy bins. In an eighth example of the method, optionally including one or more or each of the first through seventh examples, generating the ground truth reference output using the calibration detector data further comprises: receiving a selected imaging mode from a user of the PCCT system, calculating attenuation coefficients of a plurality of selected basis materials from the calibration detector data, calculating the ground truth reference output based on the selected imaging mode, the attenuation coefficients, and estimated thicknesses of the plurality of selected basis materials. In a ninth example of the method, optionally including one or more or each of the first through eighth examples, the method further comprises: calculating the single scalar output value of the detector element by applying a correction function to the linear weighted sum, the correction function including parameters determined during the calibration of the PCCT system. In a tenth example of the method, optionally including one or more or each of the first through ninth examples, the image is one of: a virtual monoenergetic image (VMI), a material decomposition image, and a conventional single kV CT image.

The disclosure also provides support for a photon-counting computed tomography (PCCT) system, comprising: an X-ray source that emits a beam of X-rays toward a subject to be imaged, a photon-counting detector that receives the beam of X-rays attenuated by the subject, and a data acquisition system (DAS) operably connected to the photon-counting detector and configured to: during a scan of an imaging subject, obtain detector data from a detector element of the photon-counting detector, the detector data comprising photon counts partitioned into a plurality of energy bins based on an energy imparted by each photon on the detector element, encode the photon counts at the plurality of energy bins of the detector element into a single scalar output value representing a distribution of spectral information across the energy bins, and reconstruct an image, without performing a basis material decomposition process, from projection data acquired via the photon-counting detector, the projection data including the single scalar output value generated at the detector element. In a first example of the system, the single scalar output value is calculated based on computing a line integral of a ratio between: a first linear weighted sum of the photon counts, the first linear weighted sum obtained by multiplying each photon count by a corresponding weight of a weight vector, and a second linear weighted sum of a plurality of air counts, the second linear weighted sum obtained by multiplying each air count by a corresponding weight of the weight vector, the air counts and the weight vector generated during a calibration of the PCCT system. In a second example of the system, optionally including the first example, the weight vector is calculated based on a calibration vector obtained from a calibration scan of a phantom, the calibration vector comprising photon counts partitioned into the plurality of energy bins of the detector element based on the energy of each photon that impinges on the detector element. In a third example of the system, optionally including one or both of the first and second examples, the weight vector is generated in accordance with a method that minimizes: a bias of an estimated output of the detector element from a reference ground truth output of the detector element, the reference ground truth output generated using the calibration vector, and a variance between the estimated output of the detector element based on a linear weighted sum of photon counts at the plurality of energy bins, and a second estimated output of the detector element based on equal weighting of the photon counts at the plurality of energy bins. In a fourth example of the system, optionally including one or more or each of the first through third examples, the single scalar output value of the detector element is calculated by applying a correction function to the computed line integral, the correction function including parameters determined during the calibration of the PCCT system.

The disclosure also provides support for a method for a photon-counting computed tomography (PCCT) system, the method comprising: during a calibration of the PCCT system, for a detector element of a photon-counting detector of the PCCT system: performing a first calibration scan of a phantom to obtain a calibration vector for the detector element, the calibration vector including photon counts at each of a plurality of energy bins based on an energy of each photon that impinges on the detector element, performing a second calibration scan without a scanned object, to generate a vector of air counts, the air count vector including photon counts at each of the plurality of energy bins based on the energy of each photon that impinges on the detector element, generate a ground truth reference output of the detector element using the calibration vector, determine a set of weights that minimizes a bias of an output of the detector element from the ground truth reference output and a variance of the output with respect to an output based on equal weights, store the calibration vector, the air count vector, and a weight vector including the set of weights in a memory of the PCCT system, and during a subsequent scan of an imaging subject: obtaining photon counts at the plurality of energy bins of the detector element, retrieving the weight vector and the air count vector from the memory, calculating a linear weighted sum of the photon counts using the weight vector and the air count vector, applying a correction function to the linear weighted sum to generate the output of the detector element, the correction function including parameters determined during the calibration of the PCCT system, and reconstructing an image from projection data of the photon-counting detector, the projection data including the output of the detector element. In a first example of the method, the method further comprises: reconstructing the image from the projection data without performing a basis material decomposition process. In a second example of the method, optionally including the first example, calculating the linear weighted sum of the photon counts using the weight vector and the air count vector further comprises calculating a line integral of a ratio between the linear weighted sum of the photon counts and a second linear weighted sum of the air counts. In a third example of the method, optionally including one or both of the first and second examples, generating the ground truth reference output further comprises: receiving a selected imaging mode from a user of the PCCT system, calculating the ground truth reference output based on the selected imaging mode, the calibration vector, attenuation coefficients of a plurality of selected basis materials, and estimated thicknesses of the plurality of selected basis materials.

When introducing elements of various embodiments of the present disclosure, the articles "a," "an," and "the" are intended to mean that there are one or more of the elements. The terms "first," "second," and the like, do not denote any order, quantity, or importance, but rather are used to distinguish one element from another. The terms "comprising," "including," and "having" are intended to be inclusive and mean that there may be additional elements other than the listed elements. As the terms "connected to," "coupled to," etc. are used herein, one object (e.g., a material, element, structure, member, etc.) can be connected to or coupled to another object regardless of whether the one object is directly connected or coupled to the other object or whether there are one or more intervening objects between the one object and the other object. In addition, it should be understood that references to "one embodiment" or "an embodiment" of the present disclosure are not intended to be interpreted as excluding the existence of additional embodiments that also incorporate the recited features.

In addition to any previously indicated modification, numerous other variations and alternative arrangements may be devised by those skilled in the art without departing from the spirit and scope of this description, and appended claims are intended to cover such modifications and arrangements. Thus, while the information has been described above with particularity and detail in connection with what is presently deemed to be the most practical and preferred aspects, it will be apparent to those of ordinary skill in the art that numerous modifications, including, but not limited to, form, function, manner of operation and use may be made without departing from the principles and concepts set forth herein. Also, as used herein, the examples and embodiments, in all respects, are meant to be illustrative only and should not be construed to be limiting in any manner.

The invention claimed is:

1. A method for a photon-counting computed tomography (PCCT) system, the method comprising:
    during a scan of an imaging subject, obtaining photon counts from a detector element of a photon-counting detector of the PCCT system, the photon-counting detector having a plurality of detector elements including the detector element, the photon counts partitioned into a plurality of energy bins based on an energy imparted by each photon on the detector element;
    encoding the photon counts at the plurality of energy bins of the detector element into a single scalar output value, the single scalar output value representing a distribution of spectral information across all of the plurality of energy bins, wherein a respective single scalar output value is generated for each detector element of the plurality of detector elements; and reconstructing an image from projection data acquired via the photon-counting detector, the projection data including each single scalar output value generated at each detector element;

wherein a basis material decomposition process is not performed during image reconstruction.

2. The method of claim 1, wherein the single scalar output value is generated at the detector element and transmitted to an image reconstructor of the PCCT system to reconstruct the image, and the photon counts are not transmitted to the image reconstructor.

3. The method of claim 1, wherein encoding the photon counts at the plurality of energy bins of the detector element into the single scalar output value further comprises calculating a linear weighted sum of the photon counts.

4. The method of claim 3, wherein calculating the linear weighted sum further comprises multiplying each photon count by a corresponding weight of a weight vector corresponding to the detector element stored in a memory of the PCCT system, the weight vector selected from a set of weight vectors generated during a calibration of the PCCT system.

5. The method of claim 4, wherein the corresponding weights of the weight vectors are calculated based on calibration detector data obtained from calibration scans of phantoms, the calibration detector data comprising, for each detector element of the photon-counting detector, photon counts partitioned into the plurality of energy bins based on the energy of each photon that impinges on the detector element.

6. The method of claim 5, further comprising generating the weights in accordance with a method that minimizes:
  a bias of an estimated output of the detector element from a ground truth reference output of the detector element, the reference ground truth output generated using the calibration detector data; and
  a variance between the linear weighted sum and a second estimated output of the detector element based on equal weighting of the photon counts at the plurality of energy bins.

7. The method of claim 6, wherein generating the ground truth reference output using the calibration detector data further comprises:
  receiving a selected imaging mode from a user of the PCCT system;
  calculating attenuation coefficients of a plurality of selected basis materials from the calibration detector data;
  calculating the ground truth reference output based on the selected imaging mode, the attenuation coefficients, and estimated thicknesses of the plurality of selected basis materials.

8. The method of claim 4, wherein the weight vector is selected from the set of weight vectors based on a selected imaging mode.

9. The method of claim 4, wherein calculating the linear weighted sum further comprises calculating a line integral of a ratio between the linear weighted sum and a second linear weighted sum of a plurality of air counts generated during the calibration of the PCCT system, the second linear weighted sum of the plurality of air counts calculated using the weight vector.

10. The method of claim 9, further comprising calculating the single scalar output value of the detector element by applying a correction function to the linear weighted sum, the correction function including parameters determined during the calibration of the PCCT system.

11. The method of claim 1, wherein the image is one of:
  a virtual monoenergetic image (VMI);
  a basis material image; and
  a conventional single kV CT image.

12. A photon-counting computed tomography (PCCT) system, comprising:
  an X-ray source that emits a beam of X-rays toward a subject to be imaged;
  a photon-counting detector that receives the beam of X-rays attenuated by the subject, the photon-counting detector comprising a plurality of detector elements;
  a data acquisition system (DAS) operably connected to the photon-counting detector and configured to:
    during a scan of an imaging subject, obtain detector data from a detector element of the photon-counting detector, the detector data comprising photon counts partitioned into a plurality of energy bins based on an energy imparted by each photon on the detector element; and
    encode the photon counts at the plurality of energy bins of the detector element into a single scalar output value representing a distribution of spectral information across all of the plurality of energy bins, wherein a respective single scalar output value is generated for each detector element of the plurality of detector elements; and
  an image reconstructor configured to reconstruct an image, without performing a basis material decomposition process, from projection data acquired via the photon- counting detector, the projection data including each single scalar output value generated at each detector element.

13. The system of claim 12, wherein the single scalar output value is calculated based on computing a line integral of a ratio between:
  a first linear weighted sum of the photon counts, the first linear weighted sum obtained by multiplying each photon count by a corresponding weight of a weight vector; and
  a second linear weighted sum of a plurality of air counts, the second linear weighted sum obtained by multiplying each air count by a corresponding weight of the weight vector, the air counts and the weight vector generated during a calibration of the PCCT system.

14. The system of claim 13, wherein the weight vector is calculated based on a calibration vector obtained from a calibration scan of a phantom, the calibration vector comprising photon counts partitioned into the plurality of energy bins of the detector element based on the energy of each photon that impinges on the detector element.

15. The system of claim 14, wherein the weight vector is generated in accordance with a method that minimizes:
  a bias of an estimated output of the detector element from a reference ground truth output of the detector element, the reference ground truth output generated using the calibration vector; and
  a variance between the estimated output of the detector element based on a linear weighted sum of photon counts at the plurality of energy bins, and a second estimated output of the detector element based on equal weighting of the photon counts at the plurality of energy bins.

16. The system of claim 13, wherein the single scalar output value of the detector element is calculated by applying a correction function to the computed line integral, the correction function including parameters determined during the calibration of the PCCT system.

17. A method for a photon-counting computed tomography (PCCT) system, the method comprising:
during a calibration of the PCCT system, for a detector element of a photon- counting detector of the PCCT system:
performing a first calibration scan of a phantom to obtain a calibration vector for the detector element, the calibration vector including photon counts at each of a plurality of energy bins based on an energy of each photon that impinges on the detector element;
performing a second calibration scan without a scanned object, to generate a vector of air counts, the air count vector including photon counts at each of the plurality of energy bins based on the energy of each photon that impinges on the detector element;
generate a ground truth reference output of the detector element using the calibration vector;
determine a set of weights that minimizes a bias of an output of the detector element from the ground truth reference output and a variance of the output with respect to an output based on equal weights;
store the calibration vector, the air count vector, and a weight vector including the set of weights in a memory of the PCCT system; and
during a subsequent scan of an imaging subject:
obtaining photon counts at the plurality of energy bins of the detector element;
retrieving the weight vector and the air count vector from the memory;
calculating a linear weighted sum of the photon counts using the weight vector and the air count vector;
applying a correction function to the linear weighted sum to generate the output of the detector element, the correction function including parameters determined during the calibration of the PCCT system; and
reconstructing an image from projection data of the photon-counting detector, the projection data including the output of the detector element.

18. The method of claim 17, further comprising reconstructing the image from the projection data without performing a basis material decomposition process.

19. The method of claim 17, wherein calculating the linear weighted sum of the photon counts using the weight vector and the air count vector further comprises calculating a line integral of a ratio between the linear weighted sum of the photon counts and a second linear weighted sum of the air counts.

20. The method of claim 17, wherein generating the ground truth reference output further comprises:
receiving a selected imaging mode from a user of the PCCT system;
calculating the ground truth reference output based on the selected imaging mode, the calibration vector, attenuation coefficients of a plurality of selected basis materials, and estimated thicknesses of the plurality of selected basis materials.

\* \* \* \* \*